US006990471B1

(12) United States Patent
Rajaram

(10) Patent No.: US 6,990,471 B1
(45) Date of Patent: Jan. 24, 2006

(54) METHOD AND APPARATUS FOR SECURE ELECTRONIC COMMERCE

(75) Inventor: Yashwanth Kumar Rajaram, Sunnyvale, CA (US)

(73) Assignee: Oracle International Corp., Redwood Shores, CA (US)

( * ) Notice: Subject to any disclaimer, the term of this patent is extended or adjusted under 35 U.S.C. 154(b) by 544 days.

(21) Appl. No.: 09/921,961

(22) Filed: Aug. 2, 2001

(51) Int. Cl.
*G06F 17/60* (2006.01)

(52) U.S. Cl. .............................. 705/64; 705/1; 380/28; 380/42; 380/268

(58) Field of Classification Search .................. 705/64, 705/1; 380/28, 42, 368
See application file for complete search history.

(56) References Cited

U.S. PATENT DOCUMENTS 5,544,246 A * 8/1996 Mandelbaum et al. ........ 705/65
5,590,197 A * 12/1996 Chen et al. .................... 705/65
6,000,832 A * 12/1999 Franklin et al. ............ 700/232
6,021,202 A * 2/2000 Anderson et al. ............. 705/54

FOREIGN PATENT DOCUMENTS

WO WO 01/73706 A1 * 4/2001

OTHER PUBLICATIONS

Applied Cryptography, 2nd Edition, 1996 Bruce Schneier pp. 41-44.*
Applied Cryptography 2nd edition, p. 35.*

* cited by examiner

*Primary Examiner*—Firmin Backer
*Assistant Examiner*—John Winter
(74) *Attorney, Agent, or Firm*—Park, Vaughan & Fleming, LLP; Edward J. Grundler

(57) ABSTRACT

One embodiment of the present invention provides a system that facilitates secure electronic commerce. The system operates by first providing a consumer with a file of security data relating to an account maintained by a financial institution. The consumer then creates a financial transaction with a merchant using security data from the file to protect the financial transaction. This financial transaction is structured to prevent the merchant from knowing the account number for the account. Next, the merchant validates that the financial institution identified by the financial transaction is acceptable using security data from the file. The merchant then requests that the financial institution authorize the financial transaction. Upon receiving authorization to complete the financial transaction, the merchant completes the financial transaction. Finally, the merchant notifies the financial institution that the financial transaction is complete.

12 Claims, 3 Drawing Sheets

METHOD AND APPARATUS FOR SECURE ELECTRONIC COMMERCE

BACKGROUND

1. Field of the Invention

The present invention relates to electronic commerce. More specifically, the present invention relates to a method and an apparatus to facilitate secure electronic commerce.

2. Related Art

Electronic commerce across the Internet is rapidly becoming a mainstay of the business world. A consumer wishing to make a purchase on the Internet can use a web browser to select the desired merchandise, and then to offer payment for the merchandise.

While shopping through a web browser is convenient, paying for the merchandise presents problems. Payment can be made using a credit card, a debit card, or an electronic check. Typically, when making payment with any of these methods, the consumer reveals the account number to the merchant so that the merchant can debit the account. Since the Internet is not secure and subject to eavesdropping, the account number is typically sent in encrypted form using a secure socket layer (SSL) system.

Even though SSL can protect the account number while it is in transit over the Internet, the merchant recovers the account number and completes the transaction. In many cases, the merchant also stores the account number in a database. The database then becomes a target for attack, and if the database is not secure, can lead to compromise of the account number to an unscrupulous person. Consequently, many consumers are uncomfortable with revealing their account numbers over the Internet for fear of having their account number stolen and used illegally.

The same problem exists to some degree at a point-of-sale (POS) terminal located at a cash register at the point of sale. The account number can be learned by the merchant and, if not adequately protected, compromised.

The financial institution holding the account typically accepts the transaction as valid if the account is not identified as being invalid. The account is identified as invalid if the account is known or suspected to have been compromised, perhaps by a report of a lost credit card. The financial institution rarely checks the signature on receipts and checks against the signature on file for the account. This leaves the financial institution open to fraud.

The merchant accepting electronic transactions over the Internet has little assurance that the owner of the account originated the transaction. If the consumer later denies making the transaction, it can be difficult for the merchant to prove otherwise.

What is needed is a method and an apparatus that facilitates secure electronic commerce while eliminating the problems identified above.

SUMMARY

One embodiment of the present invention provides a system that facilitates secure electronic commerce. The system operates by first providing a consumer with a file of security data relating to an account maintained by a financial institution. The consumer then creates a financial transaction with a merchant using security data from the file to protect the financial transaction. This financial transaction is structured to prevent the merchant from knowing the account number for the account. Next, the merchant validates that the financial institution identified by the financial transaction is acceptable using security data from the file. The merchant then requests that the financial institution authorize the financial transaction. Upon receiving authorization to complete the financial transaction, the merchant completes the financial transaction. Finally, the merchant notifies the financial institution that the financial transaction is complete.

In one embodiment of the present invention, the file of security data includes a consumer identifier, a private key for encryption and authentication of data, a public key related to the private key for decryption and authentication of data, an identifier identifying the financial institution, a second public key belonging to the financial institution, an account number that has been encrypted with a key known only to the financial institution, a certificate signed by a recognized certificate authority that validates the financial institution, a certificate signed by the financial institution that validates the consumer, and computer algorithms for using the file of security data. This invention relies on the existing credit card payment processing mechanism with only minimal changes. The encrypted number is used whenever applicable.

In one embodiment of the present invention, the file of security data is provided to the consumer on a smart card.

In one embodiment of the present invention, the financial transaction is protected by first creating a hash of the financial transaction. Next, the hash, the certificate identifying the consumer, and the encrypted account number are encrypted using the financial institution's public key creating a secure envelope of transaction data. The encryption and hash are created at a secure site available only to the consumer, such as within the smart card.

In one embodiment of the present invention, the merchant requests that the financial institution authorize the financial transaction by validating the second hash of the financial transaction. The merchant generates the second hash which is a hash of the financial transaction and the same as the one generated by the consumer. The merchant sends the secure envelope and the second hash to the financial institution. The financial institution decrypts the secure envelope using the private key of the financial institution. Next, the financial institution compares the hash recovered from the secure envelope with the second hash. If the first hash is identical to the second hash, the financial institution decrypts the encrypted account number to recover the consumer's account number. After verifying that the financial transaction is valid for the account, the financial institution authorizes the financial transaction. The encryption or decryption algorithms need not be uniform and/or the same across all consumers or merchants.

In one embodiment of the present invention, the financial institution verifies that the financial transaction is valid for the account by verifying that the financial institution signed the consumer's certificate. Next, the financial institution determines that the account is a valid account and that a transaction amount is not greater than an authorized limit for the account.

In one embodiment of the present invention, the secure site available only to the consumer is within the smart card.

In one embodiment of the present invention, the merchant validates that the financial institution identified by the financial transaction is acceptable by receiving the certificate that validates the financial institution, and then validating that the recognized certificate authority signed the certificate.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Electronic Commerce System

Figure 1:
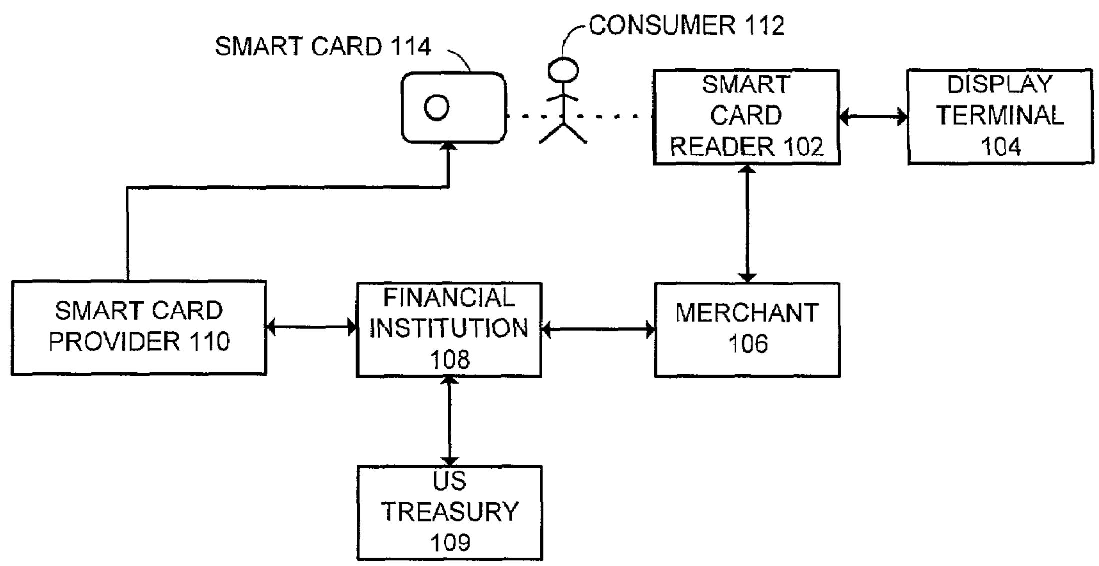
FIG. 1 illustrates an electronic commerce system in accordance with an embodiment of the present invention.

FIG. 1 illustrates an electronic commerce system in accordance with an embodiment of the present invention. The system includes smart card reader 102, display terminal 104, merchant 106, financial institution 108, US Treasury 109, smart card provider 110, consumer 112, and smart card 114. Smart card reader 102 provides an interface to smart card 114 for transferring data to and from smart card 114.

Smart card reader 102 is coupled to display terminal 104 to allow consumer 112 to view potential transactions, select an account to debit, authorize transactions, and the like. Display terminal 104 can be any device, which allows consumer 112 to display and enter data, including a personal computer with a web browser.

Smart card reader 102 is also coupled to merchant 106. Typically, this coupling is a network coupling such as the Internet. In operation, merchant 106 communicates with smart card 114 through smart card reader 102. Merchant 106 provides a transaction receipt for a financial transaction to smart card 114. In turn, smart card 114 provides a secure digital envelope containing data, which can be used to authorize the financial transaction by financial institution 108. Details of the authorization process are described below in conjunction with FIG. 3.

Merchant 106 is also coupled to financial institution 108. Merchant 106 supplies details of a financial transaction to financial institution 108 and receives authorization for the financial transaction from financial institution 108 as described below in conjunction with FIG. 3.

Financial institution 108 is coupled to US Treasury 109. US Treasury 109 provides a certificate that is digitally signed using a private key belonging to US Treasury 109. This root certificate can be used to verify that financial institution 108 is recognized by US Treasury 109 as a valid financial institution. The creation and use of certificates, for example X.509 certificates, is well known in the art and will not be described further herein.

Financial institution 108 also acts as a certificate authority and signs a certificate with its private key. This certificate can be used to verify that consumer 112 is a valid customer of financial institution 108. Financial institution 108 provides data to smart card provider 110 so that smart card provider 110 can provide smart card 114 to consumer 112. Details of the data provided to smart card provider 110 are discussed below in conjunction with FIG. 2.

Consumer 112 receives smart card 114 and separately receives a one-time personal identification number (PIN) for activation of smart card 114. Consumer 112 then activates smart card 114 as described below in conjunction with FIG. 4. After activating smart card 114, consumer 112 can use smart card 114 to enter into financial transactions with merchant 106.

A practitioner with ordinary skill in the art can readily extend the above discussion to include a secure file for use on a computing device such as a personal computer, a personal digital assistant, or the like in place of smart card 114. The operations using the secure file are the same as for using smart card 114. The advantage of using smart card 114 over a computing device with a secure file is that smart card 114 is more portable.

Smart Card 114

Figure 2:
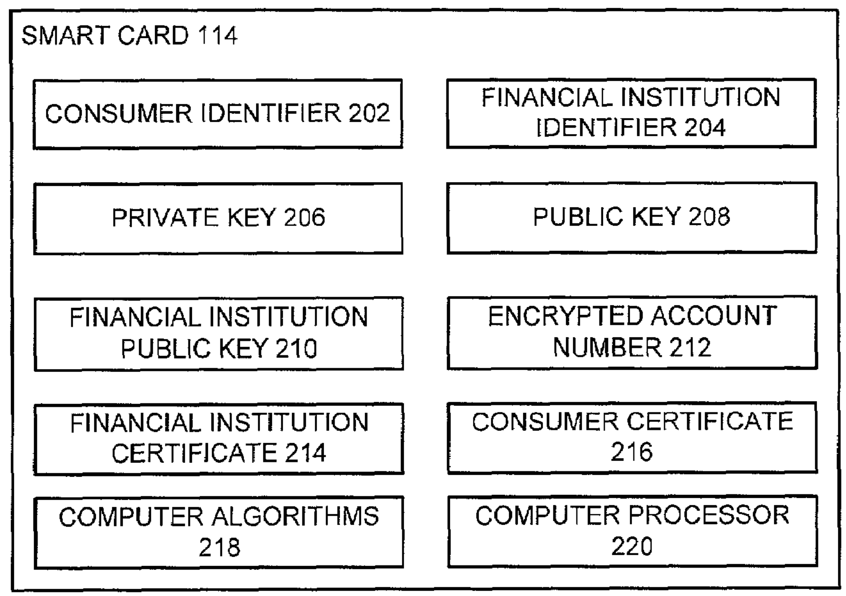
FIG. 2 illustrates smart card 114 in accordance with an embodiment of the present invention.

FIG. 2 illustrates smart card 114 in accordance with an embodiment of the present invention. Financial institution 108 provides data for smart card 114 to smart card provider 110. This data includes, but is not limited to, consumer identifier 202, financial institution identifier 204, private key 206, related public key 208, financial institution public key 210 belonging to financial institution 108, encrypted account number 212 which has been encrypted using a key known only to financial institution 108, financial institution certificate 214 signed by US Treasury 109, and consumer certificate 216 signed by financial institution 108. Smart card provider 110 stores the data received from financial institution 108 on smart card 114 along with computer algorithms 218.

Consumer identifier 202 is a unique identifier, which can identify consumer 112 to financial institution 108. Financial institution identifier 204 is a unique identifier, which can identify financial institution 108. Private key 206 is a cryptographic key associated with consumer 112. Public key 208 is also a cryptographic key. In one implementation of the present invention, private key 206 and public key 208 are a key pair used with the well-known Rivest-Shamir-Adleman (RSA) encryption algorithm.

Financial institution public key 210 is a cryptographic key that can be used to encrypt data intended for financial institution 108. In one embodiment of the present invention, only financial institution 108 has the related private key and, therefore, only financial institution 108 can read data encrypted using financial institution public key 210. Encrypted account number 212 is the account number, which will be debited for the financial transaction. Encrypted account number 212 is encrypted with a key known only to financial institution 108 and can be decrypted only by financial institution 108, thereby preventing merchant 106 or any other intermediate party from discovering the account number. Note that smart card 114 can hold multiple encrypted account numbers. If so, consumer 112 can select the encrypted account number to use for a financial transaction using display terminal 104.

Financial institution certificate 214 is signed by US Treasury 109 and serves to identify financial institution 108 as a valid financial institution recognized by US Treasury 109. Consumer certificate 216 is signed by a certificate authority associated with financial institution 108 and serves to identify consumer 112 as a holder of an account of financial institution 108.

Computer algorithms 218 are used by computer processor 220 to perform operations such as encryption, decryption, authentication, and the like. Computer processor 220 is embedded within smart card 114, providing a secure site to perform operations related to a financial transaction.

Financial Transactions

Figure 3:
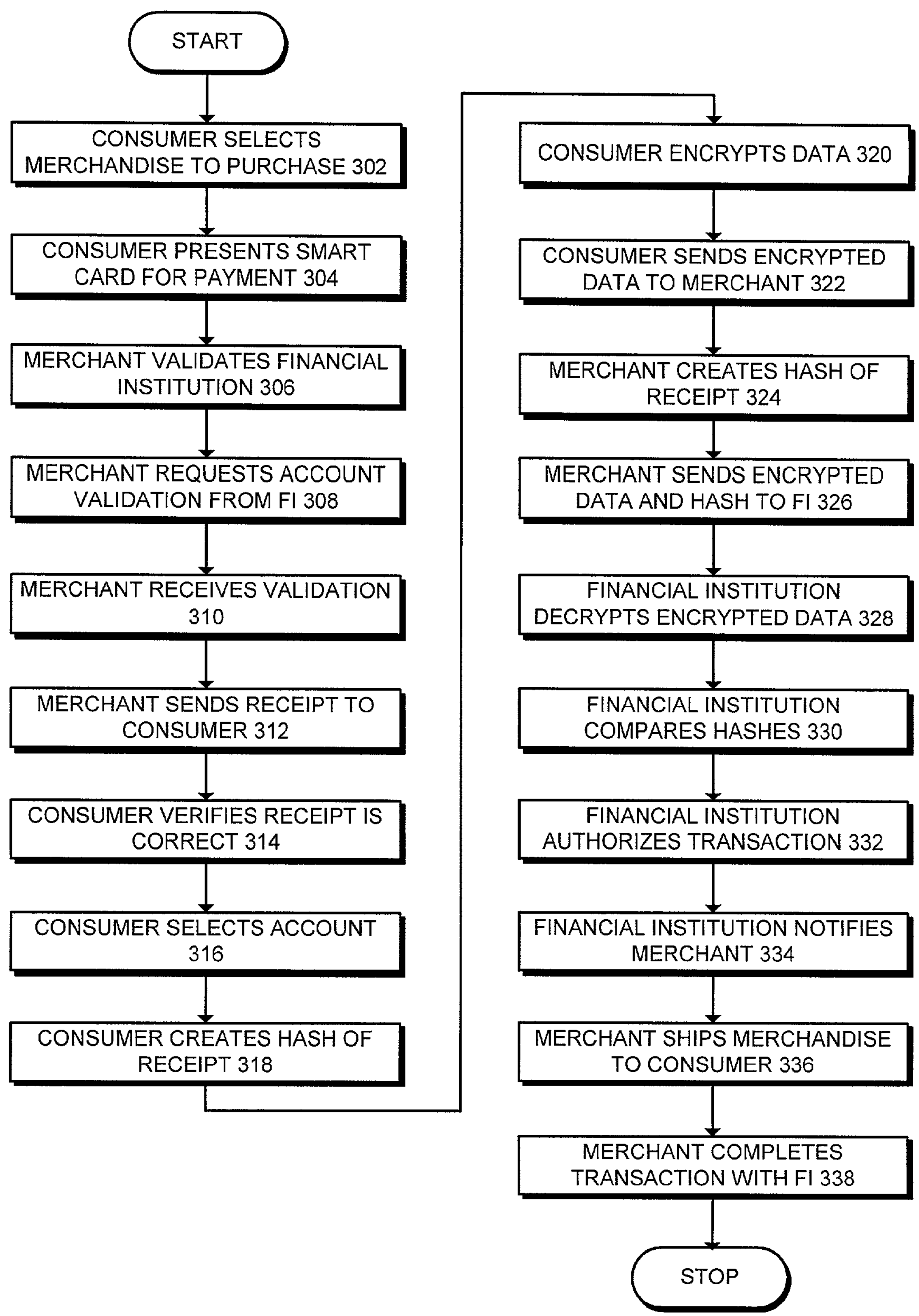
FIG. 3 is a flowchart illustrating the process of performing a financial transaction in accordance with an embodiment of the present invention.

FIG. 3 is a flowchart illustrating the process of performing a financial transaction in accordance with an embodiment of the present invention. The system starts when consumer 112 selects merchandise or services to purchase from merchant 106 (step 302). Next, consumer 112 presents smart card 114 to merchant 106 through smart card reader 102 for payment (step 304).

Merchant 106 validates that financial institution certificate 214 was signed by US Treasury 109 to ensure that financial institution 108, identified by financial institution identifier 204 is a recognized financial institution (step 306). Next, merchant 106 provides consumer identifier 202 and consumer certificate 216 to financial institution 108 to validate that consumer 112 has an account with financial institution 108 (step 308).

After financial institution 108 validates the existence of an account, merchant 106 receives account validation from financial institution 108 (step 310). Merchant 106 then sends a receipt for the transaction to consumer 112 (step 312). This receipt can be displayed to consumer 112 on display terminal 104. Consumer 112 then verifies that the receipt is correct (step 314). Next, if there is more than one account on smart card 114, consumer 112 selects an account from smart card 114 (step 316).

Consumer 112 then creates a hash of the data on the receipt using computer algorithms 218 on smart card 114 (step 318). The hash algorithm can be any algorithm suitable for creating a non-reversible signature for the receipt such as secure hash algorithm-one (SHA-1). Next, consumer 112 encrypts the receipt, the hash, and encrypted account number 212 using financial institution public key 210 (step 320). This encryption provides a secure digital envelope for transferring data to financial institution 108 while preventing merchant 106 from learning the contents. Note that other data can be included in the secure digital envelope. Consumer 112 then sends the secure digital envelope to merchant 106 (step 322).

Merchant 106 creates a hash of the data on the receipt using the same algorithm as consumer 112 (step 324). Merchant 106 then sends this hash and the secure digital envelope to financial institution 108 (step 326).

Financial institution 108 decrypts the secure digital envelope to recover the encrypted data (step 328). Financial institution 108 then compares the hash received in the secure digital envelope with the hash received from merchant 106 to establish the financial transaction as valid (step 330). Next, financial institution 108 verifies that the financial transaction does not violate any account restrictions and, if not, authorizes the financial transaction (step 332). Financial institution 108 then notifies merchant 106 that the financial transaction is valid (step 334).

Merchant 106 then delivers the merchandise or service to consumer 112 (step 336). Merchant 106 notifies financial institution 108 that the financial transaction is complete ending the process (step 338).

Initializing a Smart Card

Figure 4:
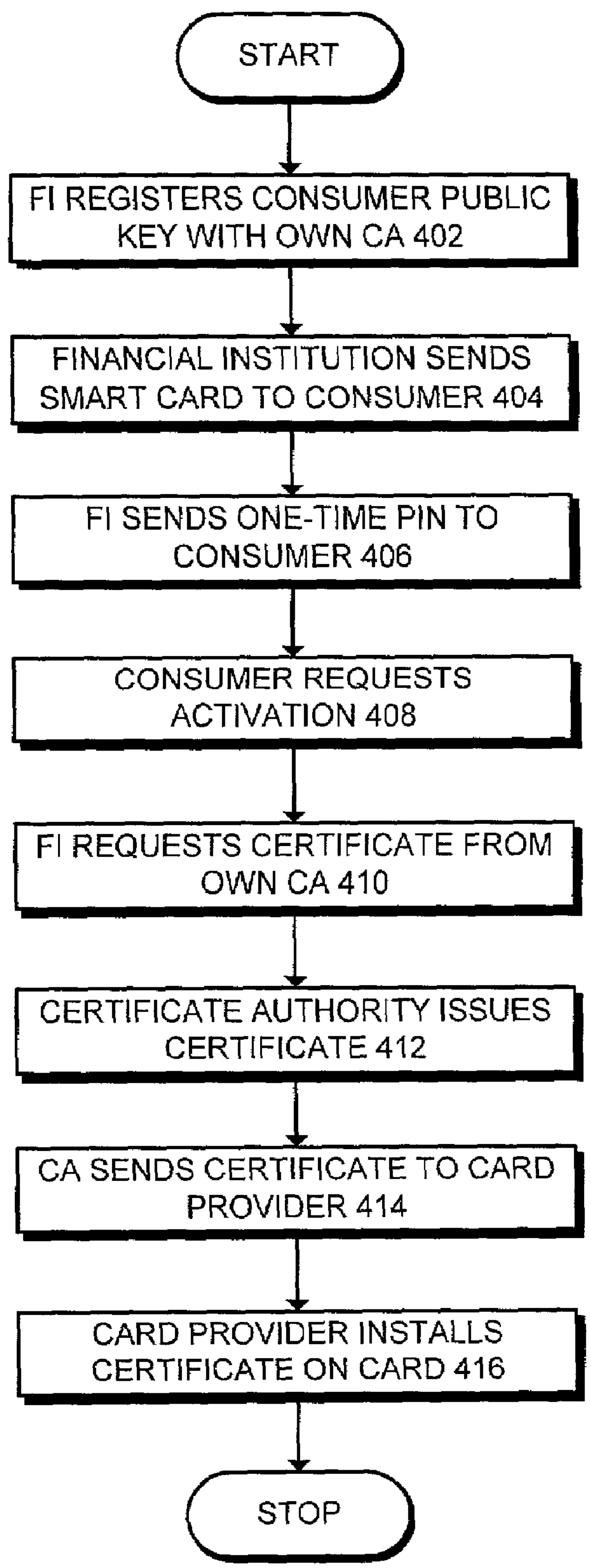
FIG. 4 is a flowchart illustrating the process of initializing a smart card in accordance with an embodiment of the present invention.

FIG. 4 is a flowchart illustrating the process of initializing a smart card in accordance with an embodiment of the present invention. The system starts when financial institution 108 registers public key 208 belonging to consumer 112 with the certificate authority related to financial institution 108 (step 402). Next, financial institution 108 sends smart card 114 to consumer 112 (step 404). Note, smart card 114 is partially initialized with data as described above in conjunction with FIG. 2 except for consumer certificate 216. Under separate cover, financial institution 108 sends a one-time personal identification number (PIN) to consumer 112 (step 406).

Using the PIN, consumer 112 requests activation of smart card 114 (step 408). In response to this request, financial institution 108 requests consumer certificate 216 from the certificate authority (step 410). Next, the certificate authority issues consumer certificate 216 (step 412).

The certificate authority sends consumer certificate 216 to smart card provider 110 (step 414). Finally, smart card provider 110 installs consumer certificate 216 on smart card 114 ending the process (step 416).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates secure electronic commerce, comprising:

providing a consumer with a file of security data relating to an account maintained by a financial institution, wherein the file of security data is provided to the consumer on a smart card, and wherein the file of security data includes:

a consumer identifier, a private key for encryption and authentication of data, a first public key related to the private key for decryption and authentication of data, an identifier identifying the financial institution, a second public key belonging to the financial institution, the account number that has been encrypted with a key known only to the financial institution creating an encrypted account number, a first certificate signed by a recognized certificate authority that validates the financial institution, a second certificate signed by the financial institution that validates the consumer, and computer algorithms to use the file of security data;

creating a financial transaction between the consumer and a merchant, wherein the financial transaction is protected using security data from the file, and wherein the financial transaction is structured to contain an account number in a form that is undecipherable by the merchant, thereby prevent the merchant from knowing the account number for the account, and wherein protecting the financial transaction involves:

creating a first hash of the financial transaction, and
encrypting the first hash, the second certificate, and the encrypted account number using the second public key creating a secure envelope of transaction data, wherein the first hash is created at a secure site available only to the consumer;

validating by the merchant that the financial institution identified by the financial transaction is acceptable using security data from the file;

wherein validating by the merchant involves:

receiving at the merchant the first certificate; and validating that the first certificate was signed by the recognized certificate authority;

requesting by the merchant that the financial institution authorize the financial transaction;

receiving by the merchant an authorization from the financial institution to complete the financial transaction;

completing the financial transaction between the consumer and the merchant; and notifying the financial institution that the financial transaction is complete.

2. The method of claim 1, wherein requesting by the merchant that the financial institution authorize the financial transaction involves:

creating a second hash of the financial transaction by the merchant;

sending the secure envelope and the second hash to the financial institution;

decrypting at the financial institution the secure envelope using the private key of the financial institution;

comparing the first hash with the second hash; and if the first hash is identical to the second hash, decrypting the encrypted account number to recover the account number for the account belonging to the consumer, verifying that the financial transaction is valid for the account, and if valid, authorizing the financial transaction.

3. The method of claim 2, wherein verifying that the financial transaction is valid for the account includes:

verifying that the second certificate was signed by the financial institution;

determining that the account is valid; and ensuring that a transaction amount is not greater than an authorized transaction amount.

4. The method of claim 1, wherein the secure site available only to the consumer is within the smart card.

5. A computer-readable storage medium storing instructions that when executed by a computer cause the computer to perform a method that facilitates secure electronic commerce, comprising:

providing a consumer with a file of security data relating to an account maintained by a financial institution, wherein the file of security data is provided to the consumer on a smart card, and wherein the file of security data includes:

a consumer identifier, a private key for encryption and authentication of data, a first public key related to the private key for decryption and authentication of data, an identifier identifying the financial institution, a second public key belonging to the financial institution, the account number that has been encrypted with a key known only to the financial institution creating an encrypted account number, a first certificate signed by a recognized certificate authority that validates the financial institution, a second certificate signed by the financial institution that validates the consumer, computer algorithms to use the file of security data;

creating a financial transaction between the consumer and a merchant, wherein the financial transaction is protected using security data from the file, and wherein the financial transaction is structured to contain an account number in a form that is undecipherable by the merchant, thereby prevent the merchant from knowing the account number for the account, and wherein protecting the financial transaction involves:

creating a first hash of the financial transaction, and encrypting the first hash, the second certificate, and the encrypted account number using the second public key creating a secure envelope of transaction data, wherein the first hash is created at a secure site available only to the consumer;

validating by the merchant that the financial institution identified by the financial transaction is acceptable using security data from the file;

wherein validating by the merchant involves:

receiving at the merchant the first certificate; and validating that the first certificate was signed by the recognized certificate authority;

requesting by the merchant that the financial institution authorize the financial transaction;

receiving by the merchant an authorization from the financial institution to complete the financial transaction;

completing the financial transaction between the consumer and the merchant; and notifying the financial institution that the financial transaction is complete.

6. The computer-readable storage medium of claim 5, wherein requesting by the merchant that the financial institution authorize the financial transaction involves:

creating a second hash of the financial transaction by the merchant;

sending the secure envelope and the second hash to the financial institution;

decrypting at the financial institution the secure envelope using the private key of the financial institution;

comparing the first hash with the second hash; and if the first hash is identical to the second hash, decrypting the encrypted account number to recover the account number for the account belonging to the consumer, verifying that the financial transaction is valid for the account, and if valid, authorizing the financial transaction.

7. The computer-readable storage medium of claim 6, wherein verifying that the financial transaction is valid for the account includes:

verifying that the second certificate was signed by the financial institution;

determining that the account is valid; and ensuring that a transaction amount is not greater than an authorized transaction amount.

8. The computer-readable storage medium of claim 5, wherein the secure site available only to the consumer is within the smart card.

9. An apparatus that facilitates secure electronic commerce, comprising:

a providing mechanism configured to provide a consumer with a file of security data relating to an account maintained by a financial institution, wherein the file of security data is provided to the consumer on a smart card, and wherein the file of security data includes:

a consumer identifier, a private key for encryption and authentication of data, a first public key related to the private key for decryption and authentication of data, an identifier identifying the financial institution, a second public key belonging to the financial institution, the account number that has been encrypted with a key known only to the financial institution creating an encrypted account number, a first certificate signed by a recognized certificate authority that validates the financial institution, a second certificate signed by the financial institution that validates the consumer, and computer algorithms to use the file of security data;

a first creating mechanism configured to create a financial transaction between the consumer and a merchant, wherein the financial transaction is protected using security data from the file, and wherein the financial transaction is structured to contain an account number in a form that is undecipherable by the merchant, thereby prevent the merchant from knowing the account number for the account;

a second creating mechanism that is configured to create a first hash of the financial transaction; and an encrypting mechanism that is configured to encrypt the first hash, the second certificate, and the encrypted account number using the second public key creating a secure envelope of transaction data wherein the first hash is created at a secure site available only to the consumer;

a first validating mechanism that is configured to validate that the financial institution identified by the financial transaction is acceptable using security data from the file;

a second receiving mechanism at the merchant that is configured to receive the first certificate; and a second validating mechanism that is configured to validate that the first certificate was signed by the recognized certificate authority;

a requesting mechanism that is configured to request that the financial institution authorize the financial transaction;

a first receiving mechanism that is configured to receive an authorization from the financial institution to complete the financial transaction;

a completing mechanism that is configured to complete the financial transaction between the consumer and the merchant; and a notifying mechanism that is configured to notify the financial institution that the financial transaction is complete.

10. The apparatus of claim 9, further comprising:

a creating mechanism that is configured to create a second hash of the financial transaction by the merchant;

a sending mechanism that is configured to send the secure envelope and the second hash to the financial institution;

a decrypting mechanism that is configured to decrypt the secure envelope using the private key of the financial institution;

a comparing mechanism that is configured to compare the first hash with the second hash;

wherein the decrypting mechanism is further configured to decrypt the encrypted account number to recover the account number for the account belonging to the consumer;

a first verifying mechanism that is configured to verify that the financial transaction is valid for the account; and an authorizing mechanism that is configured to authorize the financial transaction.

11. The apparatus of claim 10, further comprising:

a second verifying mechanism that is configured to verify that the second certificate was signed by the financial institution;

a determining mechanism that is configured to determine that the account is valid; and an ensuring mechanism that is configured to ensure that a transaction amount is not greater than an authorized transaction amount.

12. The apparatus of claim 9, wherein the secure site available only to the consumer is within the smart card.

* * * * *